Figure 1:
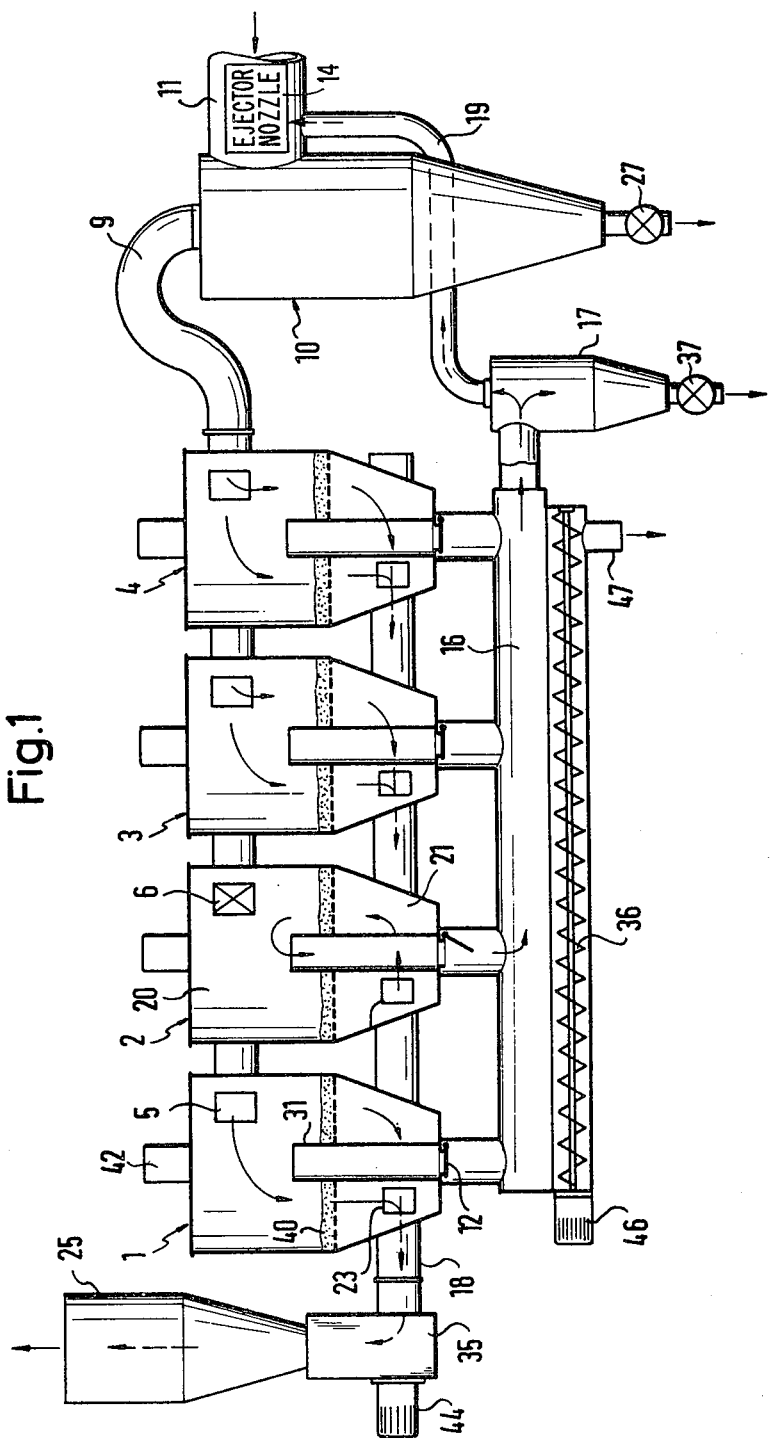

United States Patent
Berz

[11] 3,897,228
[45] July 29, 1975

[54] APPARATUS FOR SEPARATING SUSPENDED PARTICLES FROM A CARRIER GAS

[76] Inventor: Wolfgang Berz, Mauerkircherstrasse 13, 8 Munich 80, Germany

[22] Filed: Aug. 28, 1974

[21] Appl. No.: 501,184

[30] Foreign Application Priority Data
Sept. 7, 1973 Germany.............................. 2345344

[52] U.S. Cl. ...................... 55/273; 55/287; 55/288; 55/315; 55/338; 55/343; 55/350; 55/418; 55/430; 55/466; 55/467; 55/468; 55/484; 302/29

[51] Int. Cl.² .................... B01D 35/12; B01D 50/00

[58] Field of Search ..................... 55/273, 287–289, 55/315, 338, 343, 350, 418, 430, 484, 494, 512, 262, 466–468, 319; 302/29

[56] References Cited
UNITED STATES PATENTS

| | | | |
|---|---|---|---|
| 1,995,650 | 3/1935 | Rathbun ............................... 55/287 |
| 2,276,805 | 3/1942 | Tolman, Jr. ............................ 55/288 |
| 2,330,642 | 9/1943 | Tuttle ............................... 302/29 X |
| 2,515,894 | 7/1950 | Polk ................................... 55/343 X |
| 2,788,087 | 4/1957 | Lenehan ............................... 55/338 |
| 3,097,936 | 7/1963 | Lincoln.............................. 55/287 X |
| 3,146,080 | 8/1964 | Ruble et al. ....................... 55/315 X |
| 3,266,225 | 8/1966 | Barr...................................... 55/273 |
| 3,373,545 | 3/1968 | Christianson ......................... 55/273 |
| 3,473,300 | 10/1969 | Wilm et al. ...................... 55/315 X |
| 3,594,991 | 7/1971 | Berz..................................... 55/294 |
| 3,759,578 | 9/1973 | Muschelknautz et al............. 302/29 |

*Primary Examiner*—Frank W. Lutter
*Assistant Examiner*—Kathleen J. Prunner
*Attorney, Agent, or Firm*—Hans Berman

[57] ABSTRACT

A battery of filter chambers, each separated into two compartments by a horizontal layer of particulate filter medium, is operated partly in a filtering mode in which dustladen carrier gas passes downward through the filter medium, from a valve opening into the upper compartment, and partly in a purging mode in which clean gas purified in other chambers passes upward through the medium, then flows through an upright pipe having an orifice in the upper compartment and passing downward through the lower compartment into a purging gas manifold. The lower end of the upright pipe is closed by a valve in the filtering operation. The lower compartment is permanently open to a clean-gas manifold.

10 Claims, 2 Drawing Figures

APPARATUS FOR SEPARATING SUSPENDED PARTICLES FROM A CARRIER GAS

This invention relates to apparatus for separating suspended particles from a carrier gas, and is particularly concerned with an improvement in such separating apparatus which employs batteries of individual filter chambers of the type disclosed in U.S. Pat. No. 3,594,991.

For most economical around-the-clock operation in industrial applications, filter chambers of the known general type are combined in groups or batteries. The filter chambers are each divided into two compartments by a filter medium which is permeable to the carrier gas that is desired to be purified, while retaining the particles suspended therein. Normally, carrier gas passes from a first to a second compartment of each filter chamber to be purified of particles, hereinafter referred to as dust. After some time, the filter medium becomes loaded with separated dust and is purged or regenerated by a reverse gas flow from the second to the first compartment. Valves permit the reversal of the flow direction. It is preferred simultaneously to regenerate one filter chamber while using the other chambers of the group or battery for purifying raw gas. The purified or clean gas is conveniently employed for purging, and the purging gas loaded with the particles is processed in the battery itself and in associated auxiliary equipment to remove the particles.

Known dust collector batteries of the type described can be operated continuously over long periods, and each filter chamber is shifted automatically between its two modes of operation in a cycle chosen for the specific type of gas and dust to be separated. Ultimately, however, the known arrangements need to be shut down and cleaned of dust accumulating in purging gas conduits and threatening to clog the same.

It has now been found that the accumulations of dust in the known devices can be avoided if the purging gas, heavily loaded with dust from a regenerated filter chamber, does not have to carry the dust through conduits elongated in a predominantly horizontal direction, and if changes of direction of the gas are located where settling of suspended particles is beneficial rather than a source of difficulties.

The apparatus according to the invention provides a common feed manifold, a common purging gas manifold, and a common clean gas manifold for the several filter chambers. A first valve is interposed between the feed manifold and a first compartment of each filter chamber. A second valve is interposed between the same compartment and the purging gas manifold. The two valves alternatively connect the first compartment to the feed and to the purging gas manifold. A clean gas manifold permanently communicates with the second compartment of each chamber and with an outlet, such as a stack. A preliminary separator removes a portion of the particles from the carrier gas to be purified which enters an intake port of the preliminary separator. The intake port also communicates with the purging gas manifold. A discharge port of the preliminary separator communicates with the feed manifold.

Means are provided for conveying the carrier gas from the discharge port of the preliminary separator in sequence through the feed manifold, through one of the filter chambers whose first compartment is connected to the feed manifold by its first valve, through the clean gas manifold, and through the outlet. Additional means convey carrier gas from the clean gas manifold sequentially through another chamber whose first compartment is connected to the purging gas manifold by the associated second valve, through the purging gas manifold, and through the intake port into the preliminary separator.

Figure 2:
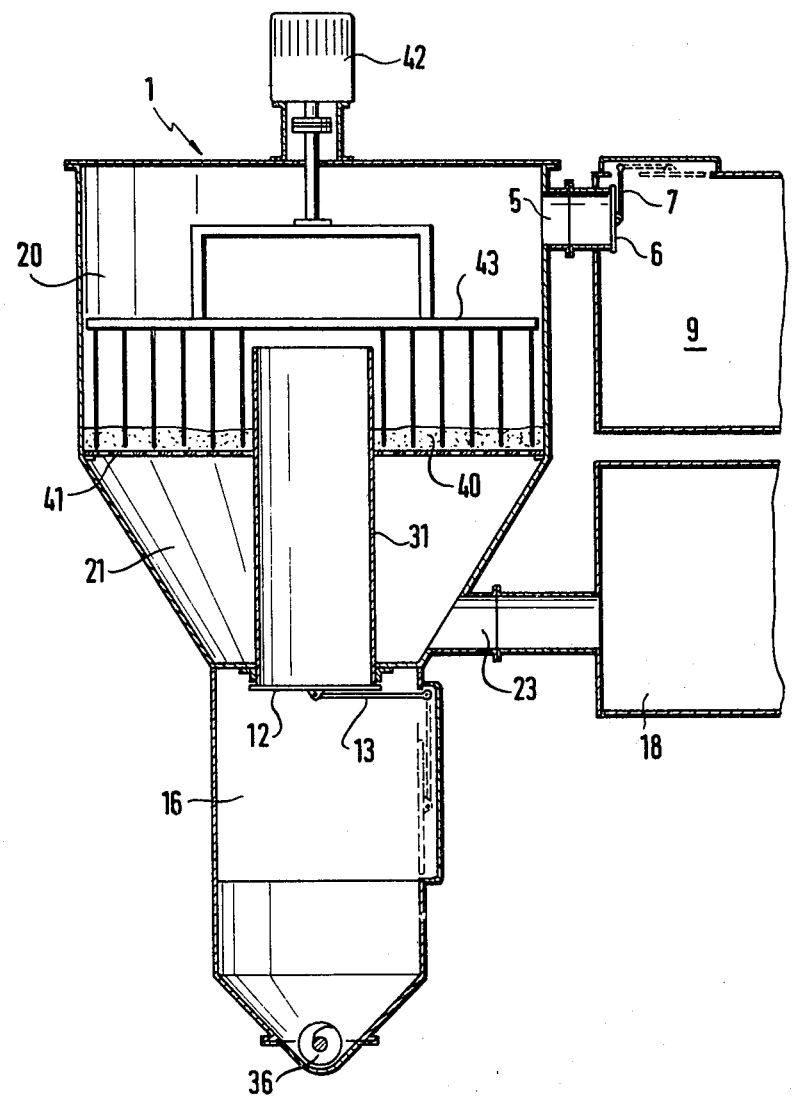

Other features, additional objects, and many of the attendant advantages of this invention will readily be appreciated as the same becomes better understood from the following detailed description of a preferred embodiment when considered in connection with the appended drawing in which:

FIG. 1 shows a dust collector arrangement of the invention in side elevation and partly in section; and FIG. 2 shows a portion of the arrangement of FIG. 1 in front-elevational section on a larger scale.

Referring initially to FIG. 1, there is seen a battery of four filter chambers 1, 2, 3, 4 of identical structure better seen in FIG. 2 which shows the chamber 1. Each chamber has an upper compartment 20 which is cylindrical about an upright axis, and a coaxial lower compartment 21 which tapers conically downward. The two compartments are separated by a layer 40 of particulate filter medium, typically sand or fine gravel, supported on a horizontal grid or screen 41 whose apertures are selected to retain the filter medium.

The top portion of the compartment 20 communicates with a feed conduit 9 through a short, horizontal branch conduit 5 which, in the condition of the chamber 1 shown in FIG. 2, is closed by a disc 6 attached to an operating rod 7 in the feed conduit 9. A non-illustrated, remotely controlled, electromagnetic actuator permits the rod 7 with the valve disc 6 to be pivoted between an open position, shown in broken lines, and the fully drawn closed position in which the disc sealingly engages the valve seat constituted by the rim of the branch conduit 5 which projects into the feed conduit 9.

A short branch conduit 23 leads from the bottom portion of the compartment 21 to a purified- or clean-gas conduit 18 and is permanently open. An upright pipe 31, much longer and wider than the branch conduit 5 and coaxial with the compartments 20, 21, leads from the gas space in the compartment 20 above the filter medium 40 through the filter layer 40, 41 and the compartment 21 into a purging gas conduit 16. The rim about the lower orifice of the pipe 31 which projects into the conduit 16 provides a seat for a circular valve disc 12 mounted on an operating rod 13 and remotely controlled as described with reference to the valve disc 6. The conduit 16 tapers downward to form a trough in which a conveyor screw 36 is arranged.

An electric motor 42, coaxially mounted on the top wall of the compartment 20, carries a comb-like agitator 43 whose tines extend from above into the layer 40 of filter medium and travel in circles about the axis of the chamber 20 when the motor 42 is energized. The agitators 43 have been omitted from FIG. 1 for the sake of clarity.

Reverting now to FIG. 1, the feed conduit 9 is seen to be a manifold connecting the branch conduits 5 associated with the several chambers 1, 2, 3, 4 to the gas discharge port of a preliminary centrifugal separator or cyclone 10, conventional in itself and not shown in detail. The preliminary separator 10 receives a dust-laden gas under pressure from its source represented by the intake pipe 11 and causes separation of the coarsest dust fraction from the remainder of the gas which is then supplied to the filter chambers. The particulate impurities collected in the preliminary separator 10 may be released from time to time through a bottom valve 27.

The purified gas conduit 18 is also a manifold which connects the branch conduits 23 to the intake of a circulating fan 35 driven by an electric motor 44. The fan 35 expedites discharge of gas from the purified-gas manifold 18 to an outlet stack 25.

The purging gas conduit 16 is a manifold which connects the several pipes 31 to a supplemental centrifugal separator or cyclone 17 dimensioned for separating fine dust particles from a relatively small volume of gas and provided with a bottom discarge valve 37 for the collected fines. The gas discharge conduit 19 of the supplemental separator 17 leads to an ejector nozzle 14 in the intake pipe 11 so that the main gas stream entering the intake port of the preliminary separator 10 exerts a strong suction action on the gas in the purging gas conduit 16. The conveyor screw 36 is in the trough-like bottom portion of the conduit 16 is driven by a motor 46 to convey the dust accumulated in the horizontal conduit 16 in the direction of gas flow, and to discharge the conveyed dust through an outlet 47 remote from the cyclone 17 into a normally sealed container, not shown which prevents escape of gas through the outlet 47.

In the condition of the apparatus shown in FIG. 1, the short, horizontal branch conduits 5 associated with the filter chambers 1, 3, 4 are open and admit air stripped of coarse particles by the preliminary separator 10 from the intake pipe 11 to the corresponding upper filter compartments 20. The fines still suspended in the air are retained in the filter medium 40, and the purified air passes through the permanently open branch conduits 23 from the lower compartments 21 of the chambers 1, 3, 4 to the purified-gas or clean-gas manifold 18. A major portion of the purified air is discharged by the fan 35 through the outlet stack 25. The pipes 31 in the chambers 1, 3, 4 are closed by the valve discs 12, and the corresponding agitator motors 42 are deenergized.

The valve disc 6 seals the branch conduit 5 leading into the upper compartment of the filter chamber 2, and the bottom of the pipe 31 in the chamber 2 is open. The ejector nozzle 14 in the intake pipe 11 draws air from the purified-gas intake manifold 18 into the lower compartment of the chamber 2 through the permanently open branch conduit 23, and the air passes upward through the filter medium 40 while the latter is being agitated by the tines driven by the motor 42 in a manner not specifically illustrated in FIG. 1, but evident from FIG. 2 and known in itself. The fines dislodged by the rising gas stream from the medium 40 are carried through the open pipe 31 into the purging gas manifold 16. Because the gas changes its direction of flow by 90° upon entering the manifold 16, and its velocity decreases due to the flow section of the manifold 16 being much greater than that of an individual pipe 31, the dust particles released from the filter medium 40 in the chamber 2 are again fractionated, the heavier or coarser particles dropping to the bottom of the manifold 16 and being discharged by the screw 36, the remainder passing to the supplemental separator 17 where an additional fine fraction is retained. What is left, re-enters the feed manifold 9 through the outlet port of the separator 10, relatively little of the finest dust particles being retained in the preliminary separator 10.

The valve discs 6, 12 are readily controlled by manually operated switches and the rods 7, 13 in such a manner as to connect the upper filter compartments 20 alternatively to the feed manifold 9 and the purging gas manifold 16. However, the several switches for the valves may be combined with the starter switches for the motors 42 in a single, multiple pole, timing switch assembly, conventional in itself and not shown, for automatically performing a fourstage cycle. One of the four filter chambers 1, 2, 3, 4 is purged of accumulated dust in respective stages of the cycle while the other three chambers operate in the filtering mode.

A fan 35 or pump is preferred to be located between the clean-air manifold 18 and the outlet stack 25 where the moving parts of the fan or pump do not make contact with the inherently abrasive particles entering the apparatus from the intake pipe 11. For the same reason, an ejector pump is preferred for conveying the carrier gas from the clean-air manifold 18 through the filter chambers whose upper compartments 20 are connected to the purging gas manifold 16 by the valve assembly including a pipe 31 and an open valve disc 12, and through the purging gas manifold into the intake port of the preliminary separator 10. An ejector pump has no moving parts and may be constructed of materials capable of withstanding abrasion by the particles in the dust-laden air entering through the pipe 11.

It is an important feature of the illustrated dust collector arrangement that it is virtually immune to clogging by dust during extended periods of operation.

What is claimed is:

1. Apparatus for separating suspended solid particles from a carrier gas comprising, in combination:
   a. a source of said carrier gas having said particles suspended therein;
   b. preliminary separator means for removing a portion of said particles from said gas, said separator means having an intake port communicating with said source and a discharge port;
   c. a feed manifold communicating with said discharge port;
   d. a plurality of filter chambers;
   e. a filter medium separating an upper compartment from a lower compartment in each of said chambers, said medium being permeable to said carrier gas while retaining said particles;
   f. a plurality of first valve means interposed between said feed manifold and the upper compartments of said chambers respectively and each operable for connecting the associated upper compartment with said feed manifold;
   g. a purging gas manifold communicating with said intake port, a portion of said purging gas manifold being elongated in a direction having a predominantly horizontal component and being located below said upper compartment;
   h. an upright pipe associated with each of said chambers, said pipe having respective orifices in the upper compartment of the associated chamber and in said portion of said purging gas manifold;
   i. second valve means operable for opening and closing each of said pipes and for thereby connecting the associated chambers with said purging gas manifold;
j. operating means operatively connected to each of said first and second valve means for alternatively connecting each of said upper compartments to said feed manifold and to said purging gas manifold;
k. an outlet;
l. a clean gas manifold permanently connecting the lower compartment of each of said chambers with said outlet;
m. first conveying means for conveying said carrier gas from said discharge port sequentially through said feed manifold, through one of said chambers, when the first compartment of said one chamber is connected to said feed manifold by said first valve means, through said clean gas manifold, and through said outlet, whereby particles not removed from said carrier gas by said preliminary separator means are retained from said carrier gas by said filter medium, and the cleaned gas is released from said clean gas manifold through said outlet;
n. second conveying means for conveying said cleaned gas from said clean gas manifold sequentially through another chamber when the first compartment of said other chamber is connected to said purging gas manifold by said second valve means, through the pipe associated with said other chamber, through said purging gas manifold, and to said intake port, whereby particles previously retained on the filter medium in said other chamber are carried by the conveyed gas from said filter medium in said other chamber through said pipe into said purging gas manifold, a part of the carried particles is deposited in said portion of the purging gas manifold adjacent the orifice therein of said pipe due to the change in the direction of flow of the conveyed gas, another part of the carried particles being conveyed with the gas to said intake; and
o. third conveying means for conveying the deposited particles from said portion of the purging gas manifold outward of said purging gas manifold separately from the gas conveyed by said second conveying means.

2. Apparatus as set forth in claim 1, wherein the flow section of said portion of the purging gas manifold is much greater than the flow section of each of said pipes, the gas being discharged from the orifice of each pipe into said portion of said purging gas manifold transversely to the direction of elongation of said portion.

3. Apparatus as set forth in claim 2, wherein said portion of said purging gas manifold is located below said lower compartment, said second valve means including a valve member arranged for movement by said valve operating means toward and away from a position of sealing engagement with one of said orifices.

4. Apparatus as set forth in claim 3, wherein said first valve means include a conduit having respective horizontally spaced orifices in said upper compartment and in said feed manifold, and a valve member movable by said valve operating means toward and away from a position of sealing engagement with one of said orifices, the length of said conduit being smaller than the length of said pipe.

5. Apparatus as set forth in clam 2, further comprising supplemental separator means interposed between said purging gas manifold and said intake port for separating another part of said particles from the gas conveyed by said second conveying means.

6. Apparatus as set forth in claim 5, wherein said other part of said particles has an average particle size smaller than the average particle size of the portion of the particles removed by said preliminary separator means.

7. Apparatus as set forth in claim 2, wherein said first conveying means include pumping means interposed between said clean gas manifold and said outlet for drawing gas from said clean gas manifold.

8. Apparatus as set forth in claim 2, wherein each of said valve means includes a valve member mounted for pivoting movement toward and away from a position in which said valve means connects said first compartment to an associated manifold.

9. Apparatus as set forth in claim 1, wherein said second and third conveying means include means for conveying said cleaned gas and said deposited particles in said portion of said purging gas manifold in opposite directions.

10. Apparatus as set forth in claim 1, wherein said portion of said purging gas manifold is formed with an outlet opening remote from said intake port, said deposited particles being discharged from said purging gas manifold through said outlet opening by said third conveying means.

* * * * *